United States Patent
Rickli

(10) Patent No.: US 7,647,840 B2
(45) Date of Patent: Jan. 19, 2010

(54) PLASTIC ULTRASONIC MEASUREMENT SECTION AND CORRESPONDING MEASUREMENT METHOD

(75) Inventor: André Rickli, Biel (CH)

(73) Assignee: Digmesa AG, Ipsach (CH)

( * ) Notice: Subject to any disclaimer, the term of this patent is extended or adjusted under 35 U.S.C. 154(b) by 27 days.

(21) Appl. No.: 12/095,963

(22) PCT Filed: Nov. 21, 2006

(86) PCT No.: PCT/EP2006/011123

§ 371 (c)(1),
(2), (4) Date: Jun. 3, 2008

(87) PCT Pub. No.: WO2007/065557

PCT Pub. Date: Jun. 14, 2007

(65) Prior Publication Data

US 2008/0271544 A1    Nov. 6, 2008

(30) Foreign Application Priority Data

Dec. 6, 2005    (CH) .................................. 01921/05

(51) Int. Cl.
*G01F 1/58* (2006.01)
(52) U.S. Cl. .................................................. 73/861.12
(58) Field of Classification Search .............. 73/861.12, 73/861.15, 861.16
See application file for complete search history.

(56) References Cited

U.S. PATENT DOCUMENTS

| | | | | |
|---|---|---|---|---|
| 5,421,210 A | * | 6/1995 | Kobayashi et al. | ........ 73/861.12 |
| 5,627,323 A | | 5/1997 | Stern | |
| 6,802,223 B2 | * | 10/2004 | Nakatani et al. | ......... 73/861.12 |
| 7,287,435 B2 | * | 10/2007 | Ketelsen | .................. 73/861.12 |

FOREIGN PATENT DOCUMENTS

| | | |
|---|---|---|
| DE | 39 41 544 A1 | 6/1991 |
| DE | WO 91/14925 | 10/1991 |
| DE | 199 44 411 | 4/2001 |
| DE | 101 20 355 | 10/2002 |
| EP | 0 223 123 | 5/1987 |
| EP | 0 521 855 | 1/1993 |
| EP | 1 413 858 | 4/2004 |
| JP | 09 287989 | 11/1997 |
| WO | WO 94/21989 | 9/1994 |

* cited by examiner

*Primary Examiner*—Jewel Thompson
(74) *Attorney, Agent, or Firm*—McGlew and Tuttle, P.C.

(57) ABSTRACT

The present invention relates to a plastic ultrasonic measurement section (1) used for the flow measurement of fluids. It is equipped with two ultrasonic transmitting and receiving transducers (2, 3) spaced in the fluid flow direction and is characterized in that the sound is guidable in Z-shaped manner between the transmitting and receiving transducers (2, 3) by means of at least two reflectors (4). A description is given of a corresponding measurement method and a method for the one-piece production of a measurement section (1) by injection moulding.

26 Claims, 2 Drawing Sheets

PLASTIC ULTRASONIC MEASUREMENT SECTION AND CORRESPONDING MEASUREMENT METHOD

TECHNICAL FIELD

The invention relates to a plastic ultrasonic measurement section and a measurement method for ultrasonic measurement corresponding to the independent claims.

PRIOR ART

The transit time difference method has evolved as the most important method for measuring the flow in technical applications. The transit time difference method makes use of the fact that the propagation rate of an ultrasonic signal is dependent on the flow rate of the medium in which it propagates. Correspondingly the ultrasonic signal moves more slowly counter to than in the flow direction. Technical realization takes place through the use of two ultrasonic transducers with identical transmission function. To determine the transmit time difference an ultrasonic pulse is transmitted through the medium in the flow direction and a second pulse in the opposite direction. Both sensors operate alternately as transmitter and receiver.

The prior art, patents and patent applications disclosed numerous variants operating according to the aforementioned principle.

Many known plastic measurement devices use a so-called colinear arrangement of the ultrasonic transducers required for the measurement, i.e. the transducers are positioned directly facing one another. As a result the flow guidance cannot be straight and must instead e.g. be coupled in U-shaped manner in the measurement chamber with the colinear arrangement and it is not possible to produce a releasable injection mould for the same. It must instead be made from two or more parts, which are welded together. This has e.g. been proposed in WO-A1-94/21989, the measurement section being constructed with a U-shape. A disadvantage thereof is that it must be welded together from several parts, which inevitably leads to welding seams in the measurement section, which are undesirable because they form particle traps.

DE-A1-39 41 544 discloses an ultrasonic measurement device, in which ultrasonic waves traverse a W-shaped beam path between two signal transducers. The sound waves are firstly reflected on the lower wall of the tube, then on the upper wall and finally on the lower tube wall again. Part of the sound waves traverses a path with only a single reflection on the lower tube wall. These sound waves are damped by fitting a damper to the lower wall.

EP-B1-521 855 describes a similar flowmeter. However, the reflecting surfaces are curved, so that the sound waves are focussed. The lower tube wall has a defocussing reflecting surface between the focussing surfaces. That part of the sound waves which traverses the measurement tube in a V-shaped path is damped. However, these measures lead to a strong damping of the acoustic signal through the flowmeter and the receiving signal transducer receives a weak signal over which is superimposed the sound waves which have followed the V-shaped path through the tube. When the signal transducer receives a weak signal it is susceptible to interference. This applies both to mechanical noise and to electromagnetic noise.

EP-A1-538 930 describes a measurement tube, whose wall has in cross-section an elliptical path. At the foci of the ellipse are located an ultrasonic transmitter and an ultrasonic receiver. Longitudinally and in the centre of the measurement tube extends an insert constituting an obstacle and having a profile, which is either also in the form of an ellipse or which is ellipse-like with tips pointing in the flow direction. The aim of this insert is to ensure that ultrasound does not pass directly from transmitter to receiver without being reflected on the measurement tube walls. The ultrasonic transmitter and ultrasonic receiver are located on the axial central axis of the measurement tube.

Such known constructions to permit measurement in oblique or V-shaped manner through the measurement section cannot be used due to the characteristics of the plastic and the necessary measurement precision.

Another disadvantage of the conventional constructions is the inclination to bubble or particle trap formation. Particularly in the case of the aforementioned publications, the bulges or angles are present which can trap the bubbles and particles and thereby falsify the measurement. At the same time many of the hydraulically unfavourable, angular inlet points have a clogging tendency due to contaminants.

REPRESENTATION OF THE INVENTION

The object of the present invention is to provide an ultrasonic measurement section and a flow measurement method avoiding the aforementioned disadvantages and in which there are no bubble or particle traps which could falsify the flow measurement.

A further object of the invention is to provide an ultrasonic measurement section and a flow measurement method excluding interferences in the measurement signal.

Another object of the invention is to provide a method for the production of an ultrasonic measurement section, which can be made from plastic by injection moulding from one piece, having no internal welding seams or other bubble or particle traps.

According to the invention these objects are achieved through the independent claims.

In particular, these objects are achieved by a plastic ultrasonic measurement section used for the flow measurement of fluids, which has two ultrasonic transmitting and receiving transducers arranged in spaced manner in the fluid flow direction and in which the sound between the transmitting and receiving transducers, can be guided in Z-shaped manner by at least two reflectors.

These objects are more particularly achieved by a flow measurement method having an inventive ultrasonic measurement section, the sound between the transmitting and receiving transducers being guided in Z-shaped manner by at least two reflectors.

The objects are achieved by a method for the production of an inventive ultrasonic measurement section comprising the following method steps:

(a) two expanding sliders, which together form a stepped contour, are placed on one another,
(b) the measurement section is produced by injection moulding around the sliders and
(c) the two sliders are extracted on different sides of the measurement section.

Advantageous embodiments are given in the subclaims.

An advantage of this measurement section is that it can be produced from one piece by injection moulding, because through the use of two sliders it is possible to release the workpiece. There are no welding seams, i.e. potential particle traps. It is also more difficult for air or gas bubbles to become fixed in liquids and rapidly traverse the measurement section, which largely avoids measurement falsifications.

Advantageously the measurement section is in stepped form and the reflectors are constituted, as a function of the characteristics of the plastics used, by the outer wall (reflection on the air surrounding the measurement section), inner wall (reflection on the plastic of the measurement section), as well as a reflector made from a suitable material, e.g. metal, fitted to the outer wall or injection moulded as an insert in the plastic, for the purpose of the necessary reflection. If the plastic wall has to be penetrated, the wall to be penetrated is advantageously of the same thickness over the entire area of the reflectors.

BRIEF DESCRIPTION OF THE DRAWINGS

The invention is illustrated by the attached drawings, wherein show:

FIG. 2a A section through an inventive ultrasonic measurement section with the path covered by the sound.

FIG. 2b The side view of FIG. 2a illustrating the stepped construction of the inventive ultrasonic measurement section.

WAYS OF IMPLEMENTING THE INVENTION

Figure 1:
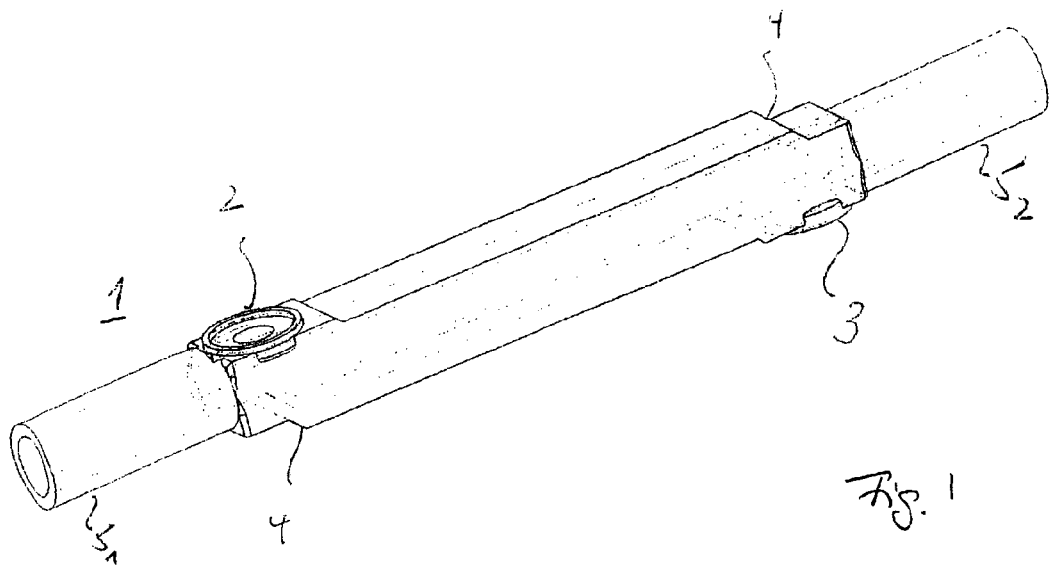
FIG. 1 A view of an inventive ultrasonic measurement section with ultrasonic transmitting and receiving transducers and reflectors.

FIG. 1 is a view of an inventive ultrasonic measurement section 1 with two spaced ultrasonic transmitting and receiving transducers 2, 3 in the fluid flow direction. The sound emitted by the transmitting transducers 2, 3 is guided through the measurement section 1 by two reflectors 4, before it is again received by the second transmitting receiver 3, 2. To determine the transit time difference and therefore the flow rate, an ultrasonic pulse is transmitted in the flow direction through the medium and a second pulse in the opposite direction. Both sensors 2, 3 alternately operate as transmitter and receiver. At both ends the ultrasonic measurement section 1 has two connection parts 5<sub>1</sub>, 5<sub>2</sub>, which are round in the embodiment shown. At the connection parts 5<sub>1</sub>, 5<sub>2</sub> the measurement section is connected to not shown external equipment passing the fluid through the measurement section 1. The ultrasonic measurement section 1 is made from one piece by injection moulding. It can e.g. be made from high-purity Teflon. The flow of gases or liquids can e.g. be measured with the ultrasonic measurement section 1. The evaluation electronics connected to the measurement section 1 has no differences compared with the prior art.

FIG. 2a shows a section through an inventive ultrasonic measurement section 1 with the ultrasonic transmitting and receiving transducers 2, 3 and reflectors 4. The path of the ultrasound in measurement section 1 is indicated by reference numeral 5. According to the invention the measurement section 1 is in the form of a stepped passage. FIG. 2b illustrates the side view of FIG. 2a, showing the stepped construction of the inventive ultrasonic measurement section. At bevels in the passage there are located the at least two reflectors 4, which reflect and pass on the sound from the ultrasonic transmitting and receiving transducers 2, 3. The inventive measurement section 1 comprises a single injection moulded part and has a straight passage through the fluid. Thus, there are no bubble or particle traps which could falsify the flow measurement in measurement section 1. Thus, interferences in the measurement signal can be prevented. As is clearly visible in FIG. 2a, between the transmitting and receiving transducers 2, 3 the sound is passed via the two reflectors 4 in Z-shaped manner through the stepped passage/measurement section 1. Simultaneously a temperature measurement sensor 7 can be located in the wall of measurement section 2 making it possible to include the temperature in the measurement data evaluation.

Figure 4:
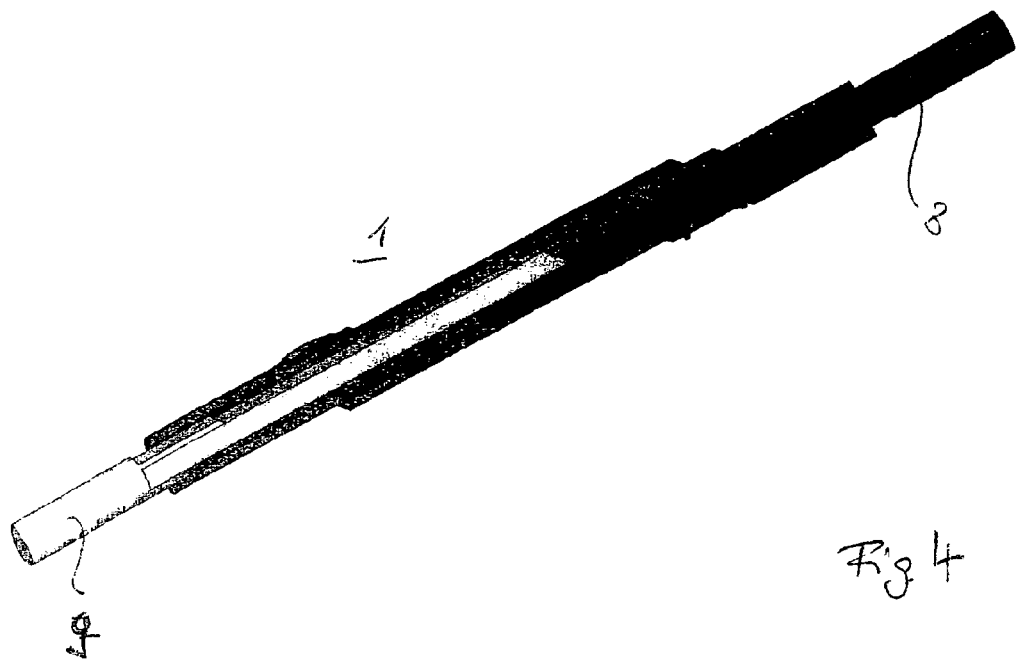
FIG. 4 A view of the two sliders used for the production of the inventive measurement section.
Figure 1:
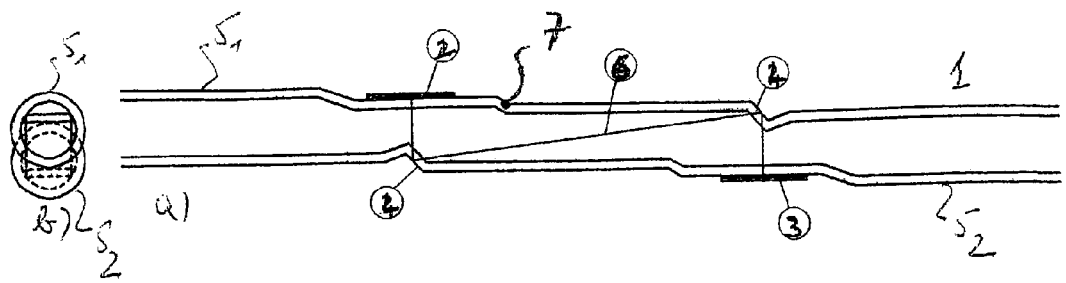
Figure 3:
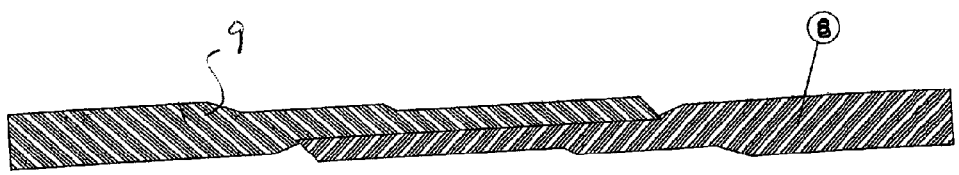
FIG. 3 A section through an inventive ultrasonic measurement section during production through two sliders.

The method for the production of the inventive measurement section 1 is diagrammatically illustrated in FIGS. 3 and 4. In a first step two expanding sliders 8, 9 are placed on one another. Together the two sliders 8, 9 form the stepped contour of measurement section 1. The measurement section 1 is then produced by injection moulding round sliders 8, 9 and thereafter the two slides 8, 9 can be in each case extracted at different sides of measurement section 1. FIG. 3 is a section through an inventive ultrasonic measurement section 1 during the production through two sliders 8, 9. All the elements which have to be fitted outside the measurement section 1 can be installed in the next step: ultrasonic transmitting and receiving transducers 2, 3, temperature measurement sensors 7 and any reflectors 4 to be fitted from the outside.

Figure 5:
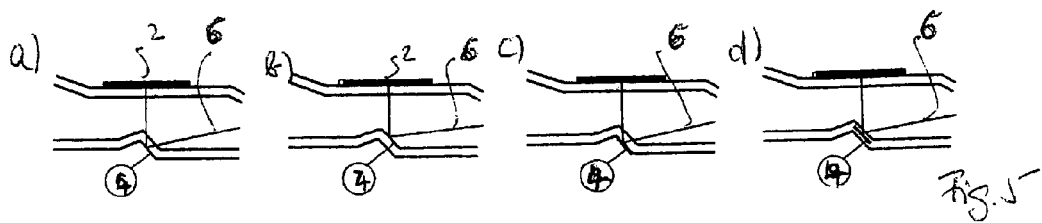
FIG. 5a-d Four different ways of fitting a reflector to the measurement section.
Figure 6:
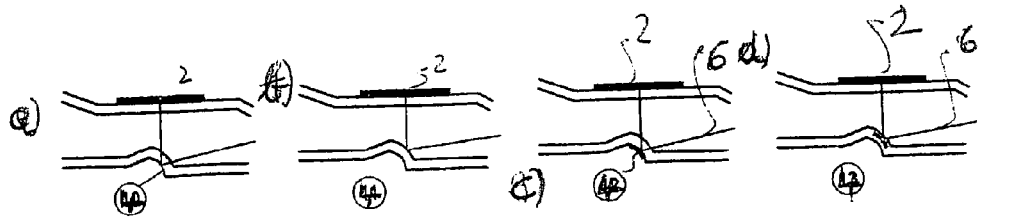
FIG. 6a-d Corresponding to FIG. 5a-d, but in each case a radius is additionally provided at the location of the reflector.

As a function of the characteristics of the plastic used in the present invention, for the necessary reflection use is made of the outer wall (FIG. 5a, reflection on the air surrounding measurement section 1), inner wall (FIG. 5b, reflection on the plastic of the measurement section 1), a reflector (FIG. 5d) made from suitable material fitted to the outer wall (FIG. 5c) or injection moulded as an insert in the plastic. The suitable material must obviously be matched individually to the acoustic properties of the plastic used. Thus, the present invention makes no use of metal reflectors which are in contact with the medium. If the plastic wall has to be penetrated, the wall to be penetrated is advantageously of the same thickness over the entire area of the reflectors.

To compensate production tolerances and temperature-caused length changes to the measurement section 1, the reflectors can have a radius, but this leads to an attenuated reception signal. The size of the radius is dependent on the materials used. The embodiments of FIGS. 6a-d corresponds to the embodiments of FIG. 5a-d, but the in each case corresponding embodiment is additionally provided with a radius.

REFERENCE NUMERALS LIST

1 Ultrasonic measurement section
2 Ultrasonic transmitting and receiving transducer
3 Ultrasonic transmitting and receiving transducer
4 Reflector
5<sub>1</sub>, 5<sub>2</sub> Left and right-hand connection part
6 Ultrasonic path, measurement section path
7 Temperature measurement sensor
8 Right-hand slider
9 Left-hand slider

The invention claimed is:

1. Ultrasonic measurement section for the flow measurement of fluid, comprising:
a passage through which the fluid flows and with two ultrasonic transmitting and receiving transducers spaced in the fluid flow direction, the sound being guidable in Z-shaped manner between the transmitting and receiving transducers by means of at least two reflectors, the measurement section comprising a single plastic piece and the reflectors being located on bevels of the passage wall.

2. Ultrasonic measurement section according to claim 1, wherein the measurement section is in the form of a stepped passage.

3. Ultrasonic measurement section according to claim 1, wherein the measurement section is in the form of a stepped passage and the at least two reflectors are located on passage bevels.

4. Ultrasonic measurement section according claim 1, wherein the measurement is made from high-purity Teflon.

5. Ultrasonic measurement section according to claim 1, wherein the measurement section is made from one piece.

6. Ultrasonic measurement section according to claim 1, wherein the measurement section is produced by injection molding.

7. Ultrasonic measurement section according to claim 1, wherein the reflectors are made from metal, air or plastic.

8. Ultrasonic measurement section according to claim 1, wherein the reflectors are located on the inside or outside of measurement section or are injection molded in the wall of measurement section.

9. Ultrasonic measurement section according to claim 1, wherein the wall of ultrasonic measurement section on which a reflector is located has a radius.

10. Ultrasonic measurement section according to claim 1, wherein a temperature measurement sensor is fitted to the measurement section.

11. Method for the flow measurement of a fluid, the method comprising the steps of:
providing an ultrasonic measurement section having a passage and two ultrasonic transmitting and receiving transducers spaced in the fluid flow direction, the sound being guided in Z-shaped manner between the transmitting and receiving transducers by means of at least two reflectors, the measurement section comprising a single plastic piece and the reflectors being located on bevels of the passage wall; and
passing fluid through said passage of said single plastic piece such that the sound is reflected on said bevels of said passage wall.

12. Method for flow measurement according to claim 11, wherein the sound is guided by a stepped measurement section.

13. Method for flow measurement according to claim 11, wherein the sound is guided by a reflector of metal, air or plastic.

14. Method for flow measurement according to claim 11, wherein the flow of gases or liquids is measured.

15. Method for flow measurement according to claim 11, wherein in addition to the flow measurement the fluid temperature is measured.

16. Method for flow measurement according to claim 11, wherein the sound is guided on a reflector located inside or outside measurement section or which is injection molded in the wall of the measurement section.

17. Method for the production of an ultrasonic measurement section according to claim 1, comprising the following method steps:
(a) two expanding sliders, which together form a stepped contour, are placed on one another;
(b) the measurement section is produced by injection molding around sliders; and
(c) the two sliders are extracted on different sides of measurement section.

18. Method for producing an ultrasonic measurement section according to claim 17, wherein subsequently ultrasonic transmitting and receiving transducers are fitted outside the measurement section.

19. Method for producing an ultrasonic measurement section according to claim 17, wherein reflectors are fitted outside or inside measurement section or are injection molded in the wall of measurement section.

20. Method for producing an ultrasonic measurement section according to claim 18, wherein the measurement section is made from high-purity Teflon.

21. Method for producing an ultrasonic measurement section according to claim 18, wherein a temperature measurement sensor is fitted to the measurement section.

22. Ultrasonic measurement section produced according to claim 18, wherein ultrasonic measurement section is made in one piece.

23. Ultrasonic measurement section according to claim 22, wherein the measurement section has a Z-shaped sound path.

24. Ultrasonic measurement section according to claim 22, wherein the ultrasonic measurement section is made of Teflon.

25. Ultrasonic measurement section according to claim 22, wherein the ultrasonic measurement section contains at least two reflectors, which are located on the inside or outside of measurement section or are injection molded into the wall of measurement section.

26. Ultrasonic measurement section according to claim 22, wherein a temperature measurement sensor is fitted to the measurement section.

* * * * *